(12) United States Patent
Leeder

(10) Patent No.: US 8,649,779 B2
(45) Date of Patent: *Feb. 11, 2014

(54) PROVIDING CUSTOMIZED INFORMATION TO A USER BASED ON IDENTIFYING A TREND

(75) Inventor: Michael A. Leeder, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,404

(22) Filed: Sep. 14, 2012

(65) Prior Publication Data

US 2013/0012176 A1    Jan. 10, 2013

Related U.S. Application Data

(63) Continuation of application No. 13/565,188, filed on Aug. 2, 2012, which is a continuation of application No. 12/274,558, filed on Nov. 20, 2008, now Pat. No. 8,244,224.

(51) Int. Cl.
H04M 3/42 (2006.01)

(52) U.S. Cl.
USPC .......... 455/414.1; 455/410; 379/207.02; 379/119; 705/35; 705/7; 705/14; 705/500

(58) Field of Classification Search
USPC .......... 455/414.1, 410; 379/207.02, 119; 705/35, 7, 14, 500
See application file for complete search history.

(56) References Cited

U.S. PATENT DOCUMENTS

| | | | |
|---|---|---|---|
| 5,732,128 A * | 3/1998 | Bushnell | 379/119 |
| 6,917,972 B1 * | 7/2005 | Basko et al. | 709/224 |
| 7,035,624 B2 * | 4/2006 | Maegawa | 455/414.1 |
| 7,240,834 B2 * | 7/2007 | Kato et al. | 235/385 |
| 7,627,872 B2 * | 12/2009 | Hebeler et al. | 719/315 |
| 7,818,224 B2 * | 10/2010 | Boerner | 705/35 |
| 2001/0034637 A1 | 10/2001 | Lin et al. | |
| 2003/0105694 A1 * | 6/2003 | Conkwright et al. | 705/35 |
| 2003/0167192 A1 * | 9/2003 | Santos et al. | 705/7 |
| 2005/0050095 A1 | 3/2005 | Hurtis et al. | |
| 2006/0276174 A1 * | 12/2006 | Katz et al. | 455/410 |
| 2007/0074258 A1 * | 3/2007 | Wood et al. | 725/105 |
| 2007/0100779 A1 * | 5/2007 | Levy et al. | 705/500 |
| 2007/0239527 A1 * | 10/2007 | Nazer et al. | 705/14 |
| 2007/0279494 A1 * | 12/2007 | Aman et al. | 348/169 |

(Continued)

FOREIGN PATENT DOCUMENTS

CN         1366758 A         8/2002

OTHER PUBLICATIONS

Russian Office Action dated May 13, 2013 for Russian Application. No. 2011120058, and English translations.

(Continued)

*Primary Examiner* — Charles Shedrick
(74) *Attorney, Agent, or Firm* — Finnegan, Henderson, Farabow, Garrett & Dunner LLP

(57) ABSTRACT

To provide customized information to the user, a wireless communications network node receives a stream of data associated with a user. A first trend associated with at least a first attribute in the stream of data is identified, and based on the identified first trend, customized information is sent for presentation to the user at a mobile station.

27 Claims, 4 Drawing Sheets

(56) References Cited

U.S. PATENT DOCUMENTS

| | | | |
|---|---|---|---|
| 2007/0286169 A1* | 12/2007 | Roman | 370/352 |
| 2008/0040226 A1* | 2/2008 | Roker | 705/14 |
| 2008/0126160 A1* | 5/2008 | Takuechi et al. | 705/7 |
| 2008/0270417 A1* | 10/2008 | Roker | 707/10 |
| 2009/0089169 A1* | 4/2009 | Gupta et al. | 705/14 |
| 2009/0305680 A1* | 12/2009 | Swift et al. | 455/414.1 |
| 2009/0319341 A1* | 12/2009 | Berkobin et al. | 705/10 |
| 2010/0172482 A1* | 7/2010 | Fotta | 379/207.02 |

OTHER PUBLICATIONS

Chinese First Office Action dated Apr. 25, 2013, issued in related Chinese Application No. 200980146758.3, (8 pages).

Second Official Action of Russian Application No. 2011120058, National Phase Application in Russia based on PCT/IB2009/007499, dated Sep. 19, 2013 (3 pages).

* cited by examiner

PROVIDING CUSTOMIZED INFORMATION TO A USER BASED ON IDENTIFYING A TREND

This application is a continuation of application Ser. No. 13/565,188, filed Aug. 2, 2012, which is a continuation of application Ser. No. 12/274,558, filed Nov. 20, 2008, (now U.S. Pat. No. 8,244,224, issued Aug. 14, 2012), which are incorporated herein by reference.

TECHNICAL FIELD

The invention relates generally to providing customized information to a user based on identifying a trend in a stream of data.

BACKGROUND

In wired networks such as the Internet, web advertising has provided a relatively large source of revenue for web content and other service providers. Web advertising includes targeted advertisements that are presented to specific users based on information associated with the users indicating that users may be interested in the targeted advertisements. A conventional approach to mining information associated with users for the purpose of generated targeted advertisements involves inserting detection triggers within commonly used services, such as web search, online purchase, or electronic mail, and storing per-user event records containing information based on the detected triggers.

The event records can include a wide variety of collected information, including search topics, keywords, visited uniform resource locators (URLs), electronic mail subjects, services used, time of usage, and so forth. Data mining techniques are then applied to the collected information to extract information from the event records to determine target advertisements that may be of interest to corresponding users. Although generally effective in producing targeted advertisements, conventional data mining techniques involve storage of a relatively large amount of data, which requires provision of a large and costly data storage and management infrastructure.

Although targeted advertisements can provide a relatively large source of revenue to service providers, the costly infrastructure that may have to be implemented for data mining purposes can dissuade some service providers, including service providers of wireless communications networks, from implementing this revenue opportunity.

SUMMARY

In general, according to an embodiment, a method of providing customized information to a user includes receiving, at a network node, a stream of data associated with the user. A trend associated with at least one attribute in the stream of data is identified, and based on the identified trend, customized information is sent for presenting to the user at a user station.

Other or alternative features will become apparent from the following description, from the drawings, and from the claims.

DETAILED DESCRIPTION

Figure 1:
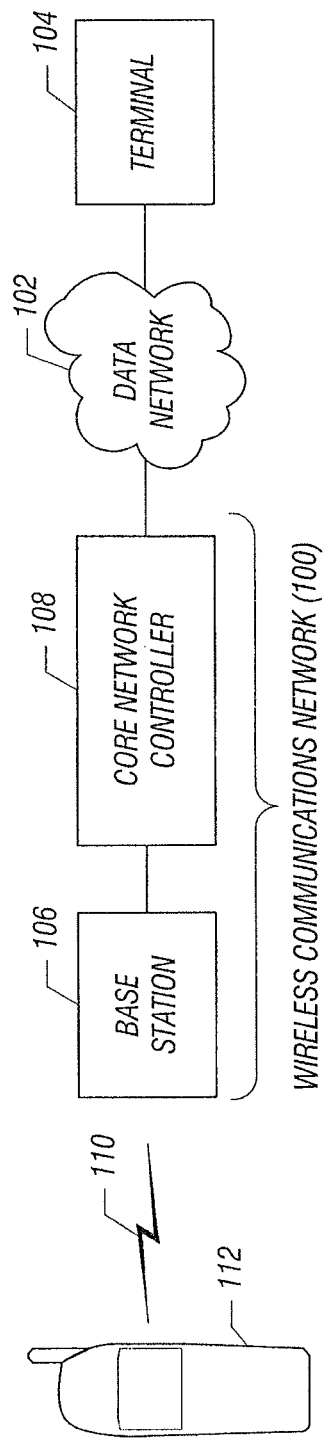
FIG. 1 is a block diagram of a communications network that includes a wireless network in which a mechanism for providing targeted advertisements according to an embodiment can be incorporated.

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments, a mechanism is provided to enable the identification of customized information that is to be provided to a user in a communications network (e.g., wired or wireless communications network). In some examples, the customized information includes advertising information, where "advertising information" refers to information that describes goods or services being offered by various entities, such as retail outlets, online retailers, educational organizations, government agencies, and so forth. The advertising information that is selected for presentation to users is referred to as targeted advertising information (or targeted advertisements). "Targeted" advertising information or advertisements refer to advertising information that may be more likely to be of interest to a particular user based on information associated with the particular user. Providing targeted advertising information to specific users is typically more effective than providing general advertising information to a wide audience.

A mechanism according to some embodiments of mining information for the purpose of producing targeted advertising information for a particular user (or group of users) uses a technique that does not require storage and mining of all data records associated with the particular user (or group of users). Instead, the mechanism identifies a trend (or multiple trends) associated with one or more attributes of a stream of data. Samples of data that are relevant to the trend(s) can be stored for later further analysis. The remaining data can be discarded. In this manner, the amount of data that has to be stored to enable provision of targeted advertisements is reduced significantly. The data storage and management infrastructure that has to be provided to enable data mining for providing targeted advertisements can be made less complex and thus less costly.

Using the mechanism according to some embodiments, a service provider in a wireless communications network is able to take advantage of increased revenue opportunities by providing targeted advertisements. A service provider of a wireless communications network refers to the entity that manages and provides communications services in the wireless communications network.

Generally, in accordance with some embodiments, a node in the wireless communications network receives a stream of data associated with a user. A trend associated with at least one attribute in the stream of data is identified, and based on the identified trend, customized information (e.g., targeted advertising information) is sent for presenting to the user at a mobile station. A "trend" refers to a usage or activity level associated with a particular user (or group of users) that exceeds some predefined threshold.

In the ensuing discussion, reference is made to providing targeted advertising information to a user. However, the same or similar techniques can be applied for presenting other forms of customized information to a user. Also, although reference is made to providing customized information to a mobile station associated with a user in a wireless communications network, it is noted that customized information can also be provided to a user station in a wired network.

FIG. 1 illustrates an exemplary communications network that includes a wireless communications network 100 and a data network 102. The data network 102 can be a packet data network such as the Internet, or some other type of data network. Wired terminals 104 are connected to the data network 102. Examples of the terminals 104 include computers, Internet phones, servers (e.g., web servers or other content servers), and so forth.

The wireless communications network 100 includes a base station 106 that is connected to a core network controller 108, which in turn is connected to the data network 102.

The base station 106 is able to communicate wirelessly over a wireless link 110 (e.g., radio frequency link) with a mobile station 112 that is within the coverage area of the base station. The base station 106 can actually be implemented with multiple nodes, including a base transceiver station (BTS) that has one or more antennas for performing wireless communication with the mobile station 112. The base station 106 can also include a base station controller or wireless network controller that provides control tasks associated with communications with mobile stations. The core network controller 108 manages communication between the wireless communications network 100 and an external network such as the data network 102, and also manages communications between mobile stations in the wireless communications network 100. Although just one base station 106 is depicted, it is noted that a typical wireless communications network 100 will include many base stations for respective coverage areas (e.g., cells) in the wireless network.

The wireless access technology of the wireless communications network 100 can be any one or more of the following: Global System for Mobile (GSM) defined by the Third Generation Partnership Project (3GPP); Universal Mobile Telecommunications System (UMTS), defined by 3GPP; Code Division Multiple Access 2000 (CDMA 2000), defined by the Third Generation Partnership Project 2 (3GPP2); Long Term Evolution (LTE) defined by 3GPP, which seeks to enhance the UMTS technology; Worldwide Interoperability for Microwave Access (WiMAX), as defined by IEEE (Institute of Electrical and Electronics Engineers) 802.16; and others.

A user associated with the mobile station 112 can perform various communications (e.g., voice communications or data communications) using the mobile station 112. For example, the user can communicate with another user in the wireless communications network 100. Alternatively, the user can communicate with a user associated with a computer or phone connected to the data network 102. As yet another example, the user can use the mobile station 112 to perform web browsing, which includes accessing websites on the data network 102 to perform search activities, online purchase activities, and other activities.

A node in or associated with the wireless communications network 100 can monitor the stream of data associated with the various communications being performed by the mobile station 112 to identify any trends associated with one or more attributes in the stream of data. Targeted advertisements can be produced based on the identified trends.

The node that can be used for monitoring the stream of data for detecting trends can be any of the nodes in the wireless communications network 100, including the base station 106 or the core network controller 108. Alternatively, another node in or associated with the wireless communications network 100 can be used for monitoring the stream of data associated with each user in the wireless communications network 100. Such a node is referred to as a "wireless communications node."

Figure 2:
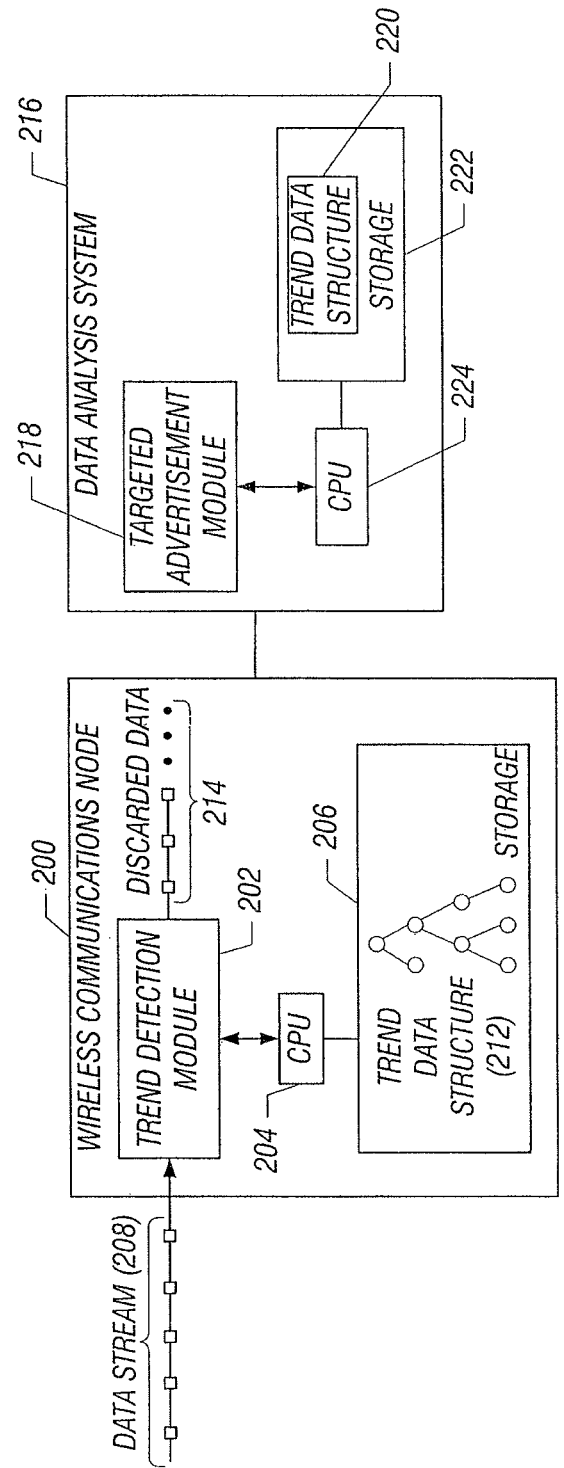
FIG. 2 is a block diagram of a wireless communications node and a data analysis system, in accordance with an embodiment of the invention.

FIG. 2 depicts the wireless communications node represented generally as 200. The wireless communications node 200 has a trend detection module 202 (for performing a trend detection algorithm) that is executable on one or more central processing units (CPUs) 204 in the wireless communications node 200. The CPU(s) 204 is (are) connected to a storage 206.

The trend detection module 202 receives a "continuous" data stream 208 associated with various communications performed by various users in the wireless communications network 100. Each box in the data stream 208 depicted in FIG. 2 can represent a data packet. A "continuous" data stream refers to a flow (or flows) of data packets that is (are) continually received by the wireless communications node 200 so long as such data is being communicated. If there is no data being communicated, then the continuous data stream would be interrupted temporarily. The data packet can contain some identifier (such as a mobile node identifier, user identifier, or some other type of identifier associated with a user of the mobile station) to distinguish data packets associated with corresponding different users.

The trend detection module 202 monitors the next available item in the continuous data stream 208. The trend detection module 202 then analyzes the item, identifies a corresponding user, and then determines if the item is associated with a particular trend (or trends). If so, a trend data structure 212 stored in the storage 206 can be updated, where the trend data structure 212 is used for storing trend information and samples of data associated with each trend.

Data items that are not related to any trend identified by the trend detection module 202 can be discarded (discarded data items are represented as 214 in FIG. 2). The discarded data items do not have to be stored by the trend detection module 202, which reduces the size and complexity of the storage subsystem needed to support the trend detection algorithm and targeted advertisement algorithm according to some embodiments.

By identifying a trend (or trends), targeted advertising information can be developed based on such trend(s). In one example, a trend can be that a relatively high percentage of calls from a specific user originate from a specific location (e.g., city, neighborhood, cell, etc.). In response to detecting such a geographic trend, targeted advertising information can be generated that relates to the specific location (e.g., targeted advertisement related to retailers in the specific location). Another trend relates to relatively frequent visits by a user of a top number (e.g., 10) of websites. The frequently visited websites can then be used to infer a user's interest, from which targeted advertisements can be developed. Another trend that can be detected is a trend based on both time and location of communications sessions. For example, a user may place most daytime calls from one location and most evening calls from another location. Based on this, targeted advertisements based on both time and location can be presented. Another trend that can be detected involves a trend based on persons that are frequently called by a user. This "circle of friends" can be used to identify a potential community of users with similar interests and demographics, from which targeted advertisements can be produced.

FIG. 2 also shows a data analysis system 216 that includes a targeted advertisement module 218 that accesses a trend data structure 220 containing information related to trends, which is stored in the storage 222. The targeted advertisement module 218 can be a software module executable on one or more CPUs 224 of the data analysis system 216. The targeted advertising module 218 generates targeted advertisements to be sent for presentation to users based on information in the trend data structure 220. The trend data structure 220 can be a copy of the trend data structure 212 contained in the storage 206 of the wireless communications node 200.

Although the trend detection module 202 and targeted advertisement module 218 are depicted on two separate systems in FIG. 2, note that these two modules can be executed on the same system, for example the wireless communications node 200 or the data analysis system 216.

In accordance with some embodiments, trend detection is based on the following assumptions:
  A=the number of attributes (e.g., location attribute, time attribute, website attribute, etc.) that the trend detection module 202 is configured to recognize;
  U=the number of users whose data is present in the continuous data stream 208; and
  T=the number of trends that the trend detection module 202 is configured to detect.

The set of attributes that the trend detector module 202 can recognize is defined as an enumerated set, as follows:

$$\text{Attributes}=\{a_j | 1 \leq j \leq A\}.$$

Some attributes $a_j$ have possible values that are disjointed and not organized in any hierarchical relationships. These are called flat attributes. Examples of flat attributes include days of the week and specific keywords.

Some attributes are not flat, but instead, have values which represent a hierarchy. There are many examples of hierarchical attributes, such as geographic location, IP addresses, and timestamps. A geographic location is hierarchical because the location of a user can be indicated as a larger geographic region (e.g., state) or a smaller geographic region (e.g., city, neighborhood). A city is located in a state, a state is located in a country, and so forth, which provides a hierarchy of relationships among the different locations.

Hierarchical attributes can be represented using a notation similar to the way in which IP (Internet Protocol) addresses are represented; specifically:

$$a=a_1, a_2, \ldots a_h, \text{ where the depth of the hierarchy is } h \text{ and } h>0.$$

Hierarchical attributes may have values that are fully qualified (e.g., IP address 47.99.88.77) or they may be partially qualified (e.g., 47.*.*.*).

The users of the system are represented as:

$$\text{Users}=\{u_i | 0 \leq i \leq U\}.$$

A trend t is defined as the intersection of one or more attributes. A trend composed of one attribute is called a one-dimensional trend, and is represented as:

$$t_{k1}=a_j \text{ where } 0 \leq j \leq A.$$

Generally, a trend which is created by intersecting d attributes is called a d-dimensional trend, and is represented by:

$$t_{kd}a_{j1} \cap \ldots \cap a_{jd} \text{ where } 0 \leq j \leq A \text{ and } d>0.$$

The number of dimensions in a trend can be any positive integer value. One example of a two-dimension trend can be a trend based on both time and location. In some exemplary implementations, the trend detection module 202 is configured to recognize a relatively small set of T high value trends (the most interesting trends based on some predefined criteria). This set of configured trends is described as:

$$\text{Trends}=\{t_{kd} | 0 \leq k \leq T, d>0\}.$$

The trend detection module 202 observes a stream of data (208), and without having to store all individual usage records, detects trends associated with each user.

The definition of a trend will vary for different attributes, and for different applications. For instance, for a mobile advertising application, the fact that a user places 70% of their mobile calls from the same location during normal business hours might be sufficient to identify a trend. However, for other attributes or other applications, percentages may not be important. For instance, a trend for an Internet service provider portal may be defined as the set of links that a user has clicked more than once.

In some embodiments, trends can be one of the following types: percentage based usage; cardinality based usage; interval based usage; and volume based usage. A percentage based usage-type trend refers to a trend that is identified based on a usage or activity level exceeding some percentage threshold. A cardinality based usage-type trend refers to a trend that is identified based on a usage or activity level exceeding some size threshold. An interval based usage-type trend refers to a trend that is identified based on a time threshold, and a volume based usage-type trend refers to a trend that is identified based on a volume threshold. Note that the types listed above are not exhaustive, as other types of trends can be used in other domains.

Each trend can be associated with a trend function, which is executed to detect the corresponding trend. The trend function can be implemented with software code, for example. Each trend can have specific one or more thresholds that demarcate trend values. For example, one threshold can indicate whether or not a trend is present: a value exceeding (greater than or less than) the threshold is indicative that the trend is present while a value not exceeding the threshold indicates that a trend is not present. Alternatively multiple thresholds can be specified; for example, a first threshold can specify a minor trend, and a second threshold can specify a major trend. In one example, an indicator referred to as "Trend_Indicator" can have the following value:

$$\text{Trend\_Indicator}=\{\text{no-trend, minor-trend, major-trend, ignored}\},$$

where "no-trend" indicates that no trend was detected, "minor-trend" indicates a minor trend was detected (usage exceeding the first threshold), "major trend" indicates a major trend was detected (usage exceeding the second threshold), and "ignored" indicates that this trend is to be ignored.

In this example, a trend threshold tuple of two trend thresholds can be defined to represent the boundaries that demarcate the minor and major trend values:
  Trend_Thold=(Trend Type, $\text{minor}_{1b}$, $\text{major}_{1b}$), where $0 \leq \text{minor}_{1b} \leq \text{major}_{1b}$, $\text{minor}_{1b}$ is the minor trend threshold, $\text{major}_{1b}$ is the major trend threshold, and Trend Type∈{percentage, cardinality, interval or volume}.

Alternatively, a normalized trend score can be used rather than mapping to finite values.

As another alternative, the trend indicator, Trend_Indicator, can have value {no-trend, trend, ignored} if the concept of "minor" and "major" trends is not used.

In some implementations, a trend vector can be defined for every user who is being analyzed by the trend detection module 202. The purpose of the trend vector is to identify all the attributes that are being monitored for that user, the trend value associated with each of these attributes, and a pointer to the data which summarizes that trend.

Each element in a trend vector is Trend_Element, as defined below:

Trend_Element={Trend_Indicator,Trend_data pointer}, where Trend_Indicator is defined above, and Trend_data pointer is a pointer (e.g., address, location identifier, uniform resource locator, etc.) to a location of data samples representative of the corresponding trend.

A trend vector is defined as an array of Trend_Elements, with one element for each trend being observed by the trend detection module 202:

Trend_Vector=array[$k$] of Trend_Elements, $0 \le k \le T$.

With this structure, it is possible for an application that requires trend information for a user, to quickly determine the set of trend(s) for that user. For instance, a mobile advertising application (e.g., targeted advertisement module 218 in FIG. 2) wishing to target advertisements to a specific user may use the trend(s) that has (have) been detected from the user's usage history, and to select advertising information that best matches that user's preferences and interests. This can be achieved by scanning the user's Trend_Vector, determining the user's trend(s), selecting a trend of interest, and retrieving the corresponding trend data.

Note that the Trend_Vector can support many different selection algorithms, depending on how the application wants to prioritize different trends, or how the application wants to handle major versus minor trends.

Although various structures are discussed above to enable identification of trends, it is noted that in alternative implementations, other types of structures can be used instead.

The problem of finding trends in a continuous stream of data is relatively straightforward for flat attributes, and primarily involves counting occurrences of specific attribute values. However, the problem becomes more complex when dealing with hierarchical attributes, since it becomes necessary to determine the level in the hierarchy at which trends occur. It is also necessary to determine whether the number of occurrences at a particular level in the hierarchy is a trend or whether it is influenced by the fact that one of its ancestors is a trend. The examples in the following section help to illustrate the difficulty of finding trends in hierarchical attributes.

In one example, the following attributes are considered:
Day of Week (DOW): flat attribute with values Sun, Mon, Tues, Wed, Thurs, Fri and Sat;
Location (Loc): hierarchical attribute with values of the form country.province/state.city.neighborhood.street;
Timestamp (Time): hierarchical attribute with values of the form year.month.day.hour.minute;
Visited URL (URL): URLs are by definition hierarchical, so it is possible to treat this as a hierarchical attribute. However, for the purposes of the mobile advertising application, it is likely more interesting to consider the fully qualified URLs (hostnme and domain). For this reason, a URL can be treated as a flat attribute.

In the above example, A=4, and Attributes={DOW, Loc, Time, URL}. The following one-dimensional trends are considered: URL; Loc; Time; and DOW.

Also, the following two-dimensional trends are considered: Loc and Time; and Loc and DOW. Thus, T=6, and Trends={Loc, URL, Time, DOW, Loc ∩ Time, Loc ∩ DOW}.

The URL trend can be defined as cardinality based, with the following thresholds:
No Trend: <2 visits to a URL,
Minor Trend: ≥2 but <5 visits to a URL,
Major Trend: ≥5 visits to a URL.
For the above example, the URL trend threshold tuple, Trend_Thold$_{URL}$, is as follows:

Trend_Thold$_{URL}$=(cardinality,2,5).

Similarly, for Loc, the trend thresholds may be defined as follows:

No trend: <5% of traffic from a specific location,

Minor Trend: ≥5% but <20% of traffic from a specific location,

Major Trend: ≥20% of traffic from a specific location.

This threshold tuple can be represented as:

Trend_Thold$_{Loc}$=(percentage,5%,20%).

The following trend thresholds are specified for the other thresholds as follows:

Trend_Thold$_{Time}$=(percentage,20%,50%)

Trend_Thold$_{DOW}$=(volume,1 M,10 M)

Trend_Thold$_{Loc\ and\ Time}$=(percentage,10%,20%)

Trend_Thold$_{Loc\ and\ Dow}$=(percentage,10%,20%).

Figure 3:
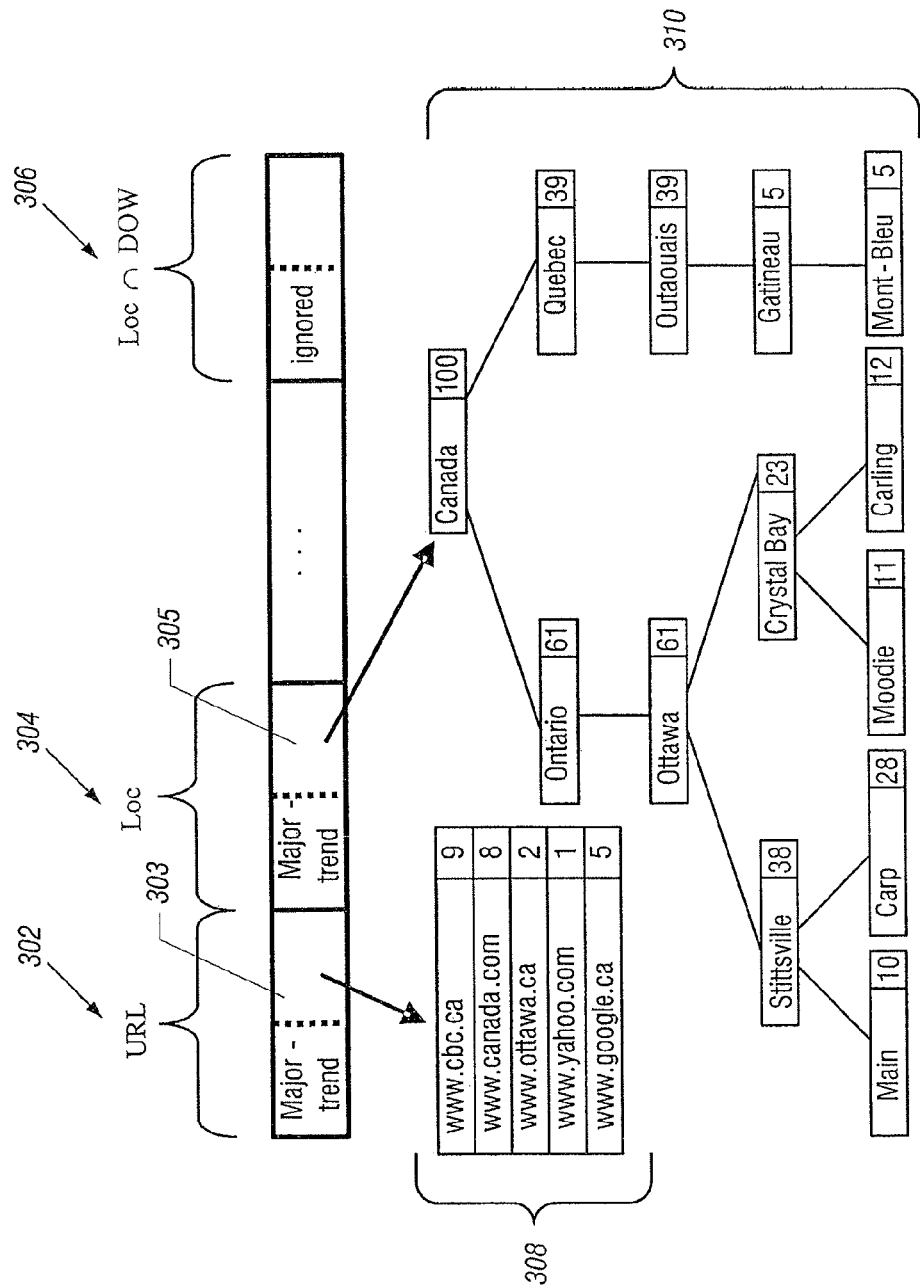
FIG. 3 illustrates data structures used in providing targeted advertisements according to an embodiment.

FIG. 3 shows a Trend_Vector for the above example. Note that a Trend_Vector includes a number of Trend_Elements, where each Trend_Element contains a Trend_Indicator and a Trend_Data pointer. In FIG. 3, a Trend_Element 302 is provided for the URL trend, a Trend_Element 304 is provided for the Loc trend, and a Trend_Element 306 is provided for the trend Loc ∩DOW.

The Trend_Element 302 for the URL trend has a Trend_Indicator value of "major-trend," which indicates that a major trend has been identified for the URL trend. The Trend_Data pointer 303 for the URL Trend_Element 302 points to a data structure 308 that lists various URLs and associated number of visits. Thus, the user has visited the URL www.cbc.ca 9 times, and has visited www.canada.com 8 times. The user has also visited www.ottawa.ca 2 times, www.yahoo.com 1 time, and www.google.ca 5 times. Based on the example major and minor thresholds defined in the example above, three of the web sites visited above are representative of major trends: www.cbc.ca; www.canada.com; and www.google.ca. From the URL trend, a web advertising application can infer specific information about the user. For example, the web advertising application may infer that the user is a Canadian resident, the user is most interested in Canadian content, and the user is interested in Canadian news. The user's URL trend also contains some attributes that are not major trends, but may be part of a minor trend. In the above example, one minor trend is www.ottawa.ca. Although this trend information is not dominant enough to infer a specific trend in the data, it may be useful for further refining the major trends that have been discovered. For example, in the example above, the web advertising application may use the minor trend to select advertisements that appeal to Ottawa residents who enjoy news-related content.

The example of FIG. 3 also shows a hierarchical Loc trend. The Trend_Element 304 for the Loc trend has a Trend_Data pointer 305 that points to a data structure 310. Since the Loc trend is a hierarchical trend, the data structure 310 that is pointed to by the Trend_Data pointer 305 can be represented as a tree structure.

In FIG. 3, the top level of the tree structure 310 represents Canada (which indicates that there have been limited activities (e.g., calls) relating to Canada. The lower levels of the tree structure 310 indicate activities relating to provinces, cities, and other smaller geographical regions in Canada. The trend threshold for this trend can be configured as:

Trend_Thold$_{Loc}$=(percentage,5%,20%).

The number associated with each node in the tree structure 310 indicates the percentage of traffic that has originated from the corresponding location. For example, 100% of the traffic originated in Canada, 61% originated in Ottawa, and so forth. Identifying a trend for a leaf node (leaf nodes "Main," "Carp," "Moodie," "Carling," and "Mont-Bleu") is relatively easy. The counts in the leaf nodes can be compared directly with the Trend_Thold$_{Loc}$ thresholds. For the leaf nodes, only the location "Carp" is identified as a major trend (since 28% is greater than 20%).

With respect to the upper levels of the tree structure 310, trend detection can become a little more difficult. For example, a determination has to be made whether the neighborhood "Stittsville," associated with an occurrence account of 38%, should be considered a major trend. Note that the high value of 38% for the "Stittsville" location is based in large part on the relatively large value (28%) for the "Carp" location. If the count of a major trend descendant, such as "Carp," is removed from the count of the ancestor, "Stittsville," then the "Stittsville" has a score of just 10%, which does not represent a major trend. In this case, in some implementations, the location "Stittsville" will not be identified as corresponding to a major trend. However, in a different implementation, the location "Stittsville" can be identified as corresponding to a major trend even though such major trend is caused by a descendant being associated with a high count.

Another example in the tree structure is a higher level node corresponding to city Outaouais, which has a count of 39%. However, note that the descendants of the location Outaouais include a neighborhood location Gatineau, which has just one descendant in the form of a street Mont-Bleu. In this scenario, it would be more appropriate to identify the city Outaouais as corresponding to a major trend and not its descendants.

The determination of whether a trend is present is in the context of a sampling interval defined as a collection period (P) during which the trend detection module 202 is observing the continuous data stream for the purpose of detecting trends. There are different ways in which the collection period P can be measured, such as a time interval, a number of observed events, and so forth. The collection period P should be sufficiently large to ensure that enough samples are taken to recognize a trend. If the collection period P is too short, the trend results could be skewed by fine-grained events, and may not properly describe the trends.

The trends should be apparent at the end of the collection period P. Before moving on to the next collection period, the trend detection module 202 (FIG. 2) normalizes the data observed during the last collection period P, as though the trend detection process has completed. This allows the trend data structures to provide an up-to-date trend perspective, which can then be used for making advertisement selection positions. After the initial collection period, the data structures can provide two views of the data: (1) an accurate prediction of trends, based on previous observation periods; and (2) a summary of recent observations, during a current observation period.

The normalization that can be performed at the end of each collection period P includes converting counts into percentages or probabilities, or other normalization tasks. The normalization can be performed by a Normalize( ) function. The Normalize( ) function is also responsible for pruning a trend tree structure (for a hierarchical trend) to remove any small occurrence data that does not constitute a trend. This is desirable since it will prevent infrequently occurring events from aggregating over time and falsely appearing as a trend after some large period of time.

There is a possibility that the trend detection algorithm can involve some amount of error due to false positives. For example, the trend detection algorithm may incorrectly guess that a trend is present based on a few observations. However, as more observations are collected, over additional collection periods, the trend detection algorithm may realize that these observations do not represent a trend. If these errors are not removed from the data structures, then these erroneous observations could aggregate over time, and can incorrectly appear as major trends. To avoid such errors, the data structures can be scanned and any errors or inaccuracies can be removed.

A Condense( ) function can be defined for scanning a trend data structure to detect any inaccuracies, and restructure the data structure as appropriate. A condense interval can be defined to indicate the interval over which the Condense( ) function is to perform its error detection and restructuring tasks. The relative sizes of P and C will vary depending on the particular application. P can be the same as C, P can be less than C, or P can be greater than C.

The trend detection algorithm can also define an Update( ) function, which is responsible for taking the latest data stream observation, and storing the data stream observations in a user's trend data structure (e.g., trend data structure 212 in FIG. 2). This step will typically involve making predictions about whether an observed event is part of a trend, and adjusting the data structure appropriately.

Figures 4, 5:
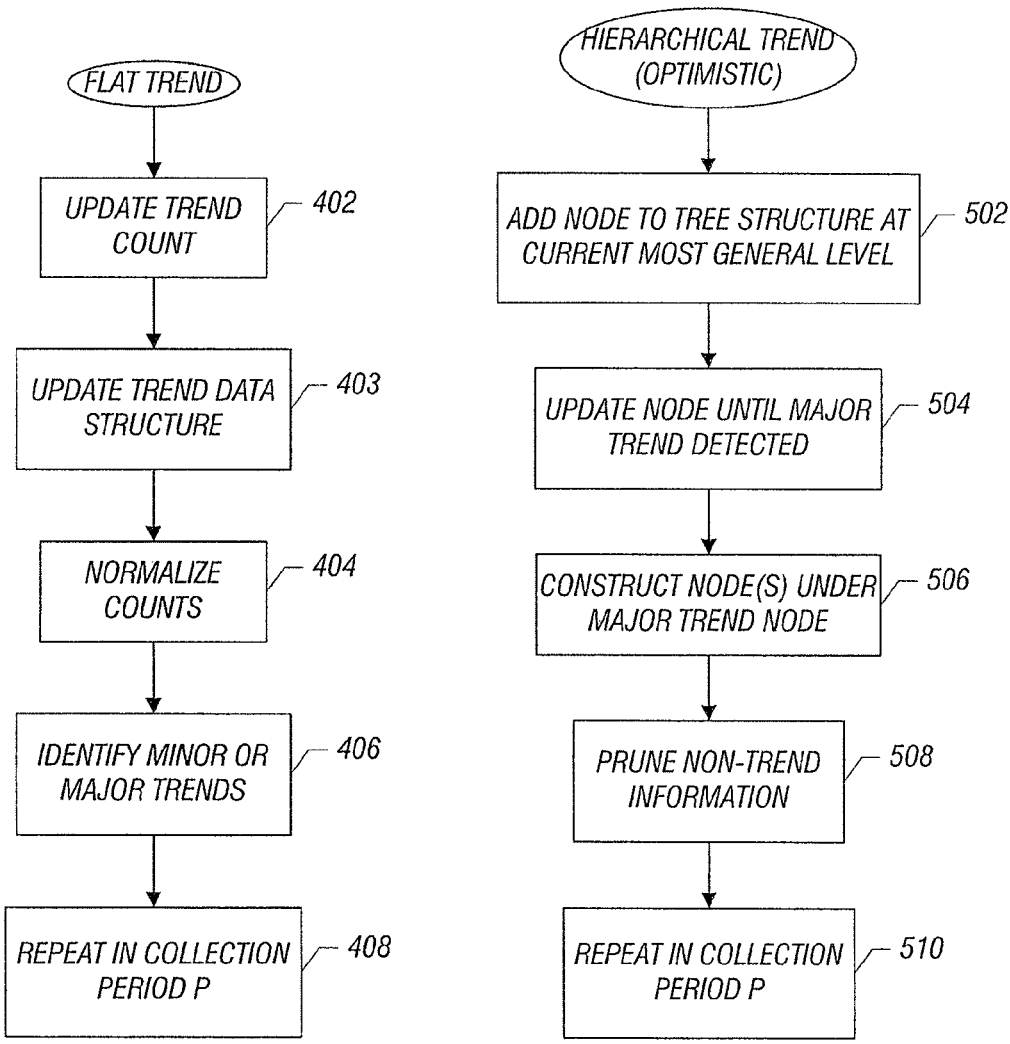
FIGS. 4-6 are flow diagrams of processes of providing targeted advertisements to users in the wireless network, according to several alternative embodiments.

FIG. 4 depicts trend detection, performed by the trend detection module 202 of FIG. 2, for an attribute that corresponds to a flat trend. As the continuous data stream is received, a trend count is updated (at 402) if a data packet is received that corresponds to the trend. For example, if a data packet is received that indicates that the user has visited a particular URL, then the count for the corresponding URL trend can be incremented. The updating can be performed by the Update( ) function discussed above.

Note also that the trend data structure (212 in FIG. 2) associated with the trend can also be updated (at 403). For example, the Update( ) function can specify that some samples of each trend be collected.

The trend detection module 202 can also normalize (at 404) counts and remove non-trend information from the trend data structure, such as by using the Normalize( ) function noted above. Normalizing involves converting raw counts to percentages, for example, or other types of normalization. Based on the normalized counts, the trend detection module 202 identifies (at 406) minor or major trends based on trend thresholds. The trend data structure is updated to reflect any such identified minor/major trends.

The process above is repeated (at 408) during the present collection period P.

For a hierarchical trend, several different possible algorithms can be used. An optimistic algorithm is depicted in FIG. 5. The optimistic algorithm updates a tree structure (e.g., 310 in FIG. 3) for the hierarchical trend in a top-down manner. Initially, a node is added to the tree data structure (at 502) at the currently most general level. In the beginning, the currently most general level is the root level of the tree structure. However, as this process iteratively progresses down the tree structure, the currently most general level may be a lower level.

Based on received data items, this added node is updated (at 504), such as by using the Update( ) function until a major trend threshold is crossed. In other words, using the top-down approach, lower level nodes in the tree structure are not added to the tree data structure until a higher-level node indicates a major trend has occurred.

Once a major trend node is identified, nodes under this major trend node are constructed (at 506). Non-trend information is pruned (at 508), such as by using the Normalize( ) function. The process repeats (at 510) during the collection period P to progressively update nodes of the tree structure.

With the optimistic approach, new nodes are added to the trend tree structure if such nodes are below a node associated with major trends. However, the optimistic approach can miss nodes. To address this, a prediction algorithm can be used to predict nodes that may be major trend nodes, and such predictive nodes can then be added to the trend tree structure. Such predictions can be performed by the Condense( ) function, for example. Any incorrectly-predicted nodes can be pruned later by the Normalize( ) function.

The optimistic approach is computationally efficient, since lower level nodes are not added in the trend tree structure until a major trend is detected at a higher level. The optimistic approach works well in identifying trends for applications in which dominant trends exist, and may not work as well for applications with less dominant trends.

Figure 6:
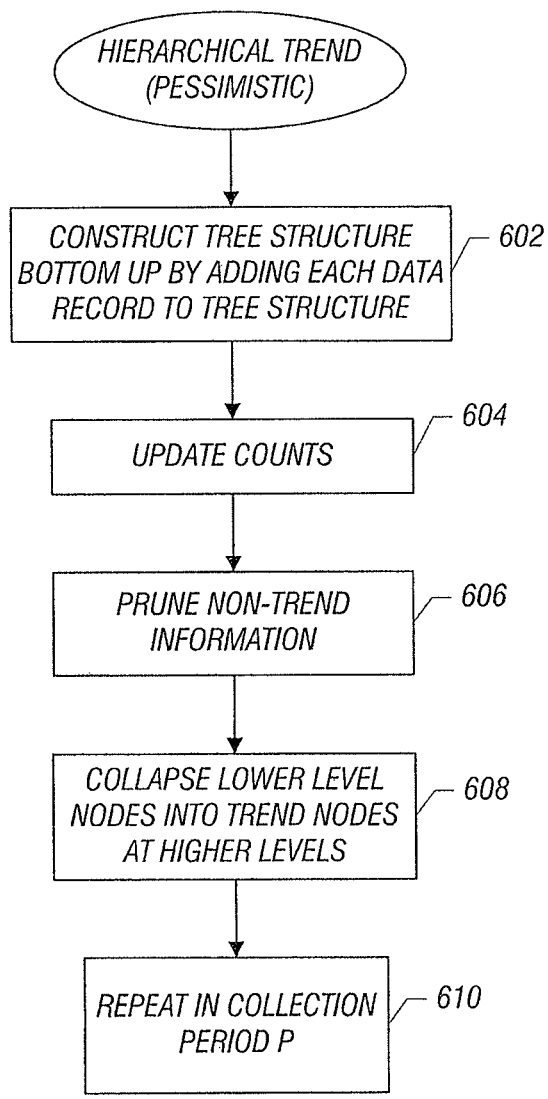

FIG. 6 shows a pessimistic approach of trend detection for a hierarchical trend. With the pessimistic approach, the trend tree structure is constructed (at 602) from the bottom up by adding each data record to the trend tree structure. The count associated with each node added to the trend tree structure is updated (at 604), such as with the Update( ) function.

Non-trend information can be pruned from the trend tree structure (at 606), using the Normalize( ) function. Also, leaf nodes are collapsed (at 608) into trend nodes at higher levels. This involves aggregating the counts associated with the lower-level nodes to determine whether a higher-level node is indicative of a major trend. The process repeats (at 610) for the collection period P.

The pessimistic approach is computationally intensive, especially for data streams with a large number of less dominant trends, since all data records are added to the tree structure and later pruned if the data records are not associated with major trends. The pessimistic approach works well for applications with less dominant trends, but is unnecessarily computationally expensive for applications with dominant trends.

A compromise algorithm can be used, which is similar to the optimistic algorithm depicted in FIG. 5. The compromise algorithm takes into account minor trends as well as major trends. With the compromise algorithm, each internal node in the trend tree structure includes a list of missed events (events associated with data records not identified as major trends). At the end of the collection period P, any of these events that correspond to a minor trend are saved; all the other insignificant events are discarded. Using the Condense( ) function, the tree structure is reconstructed to include the minor trend events (by adding the descendant node from one of the internal nodes of the trend tree structure).

Based on the major trends identified using any of the techniques described above, targeted advertisements can be generated and presented to a user at a mobile station in a wireless communications network.

Using techniques according to some embodiments, an efficient technique is provided for providing targeted advertisements (or other customized information) that does not involve storing all data records received in an input stream. In this way, mining of data records can be made possible without having to provide a large and costly data storage and management infrastructure. Service operators associated with wireless communications networks can thus take advantage of revenue opportunities without having to invest in costly infrastructure.

Instructions associated with software described above (e.g., trend detection module 202, targeted advertisement module 218, etc., in FIG. 1) can be loaded for execution on a processor (e.g., CPUs 204 and 224 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of providing customized information, comprising:
   receiving, at a wireless communications network node, a stream of data;
   identifying, at the wireless communications network node, a first trend associated with at least a first attribute in the stream of data by performing a first trend detection algorithm if the first attribute is associated with a flat trend and performing a second trend detection algorithm if the first attribute is associated with a hierarchical trend, a trend being a usage level associated with the user that exceeds a predefined threshold;
   obtaining customized information based on the identified first trend; and
   sending, by the wireless communications network node, the customized information to a mobile station.

2. The method of claim 1, wherein sending the customized information comprises sending advertising information based on the identified first trend.

3. The method of claim 1, further comprising:
   storing selected items of the data that are representative of the first trend; and
   discarding other items of the data that are not representative of the first trend.

4. The method of claim 3, further comprising:
   identifying a second trend associated with a second attribute in the stream of data;
   based on the identified second trend, sending further customized information for presenting to the user at the mobile station.

5. The method of claim 4, further comprising:
storing further selected items of the data that are representative of the second trend; and
discarding other items of the data not representative of either the first trend or second trend.

6. The method of claim 3, wherein the selected items are stored in a data structure, the method further comprising:
pruning items from the data structure that are not indicative of the first trend.

7. The method of claim 3, wherein the first trend is a hierarchical trend, and
wherein the selected items are stored in a tree structure having nodes at multiple levels, the method further comprising:
constructing the tree structure in a top-down manner.

8. The method of claim 3, wherein the first trend is a hierarchical trend, and
wherein the selected items are stored in a tree structure having nodes at multiple levels, the method further comprising:
constructing the tree structure in a bottom-up manner.

9. The method of claim 1, wherein the obtaining comprises receiving the customized information from a second server.

10. The method of claim 9, further comprising sending the identified first trend to the second server.

11. The method of claim 1, wherein the obtaining comprises selecting the customized information based on the identified first trend.

12. The method of claim 1, further comprising:
storing selected items of the data that are representative of the first trend in a first type of data structure in response to determining that the first attribute is associated with a flat trend; and
storing selected items of the data that are representative of the first trend in a tree structure in response to determining that the first attribute is associated with a hierarchical trend.

13. The method of claim 1, further comprising:
defining a first threshold indicative of a minor trend for the first attribute;
defining a second threshold indicative of a major trend for the first attribute; and
wherein identifying the first trend comprises identifying the major trend for the first attribute.

14. The method of claim 1, wherein the identified first trend is one of the following plural types: percentage-based usage type; cardinality-based usage type; and interval-based usage type, the method further comprising:
defining one or more thresholds for the identified first trend based on the type of the first trend.

15. A network node for use in a communications network, comprising:
an interface to receive a stream of data;
a processor to:
identify a first trend associated with at least an attribute in the stream of data by performing a first trend detection algorithm if the first attribute is associated with a flat trend and performing a second trend detection algorithm if the first attribute is associated with a hierarchical trend, a trend being a usage level associated with the user that exceeds a predefined threshold;
obtain customized information based on the identified first trend;
send the customized information to a user station; and
provide a pointer to selected items of the data that have been stored for the identified first trend.

16. The network node of claim 15, wherein the processor is to discard other data not associated with the identified first trend.

17. The network node of claim 15, wherein the processor is to further:
store the selected items in a first type of data structure in response to determining the attribute is associated with a flat trend; and
store the selected items of the data in a tree structure in response to determining that the attribute is associated with a hierarchical trend.

18. The network node of claim 15, wherein the customized information includes targeted advertising information.

19. The network node of claim 15, wherein the obtaining comprises receiving the customized information from a second server.

20. The network node of claim 19, wherein the processor is further configured to send the identified first trend to the second server.

21. The network node of claim 15, wherein the obtaining comprises selecting the customized information based on the identified first trend.

22. The method of claim 1, wherein the wireless communications network node is associated with an advertisement module.

23. The method of claim 1, wherein the wireless communications network node comprises an advertisement module.

24. The method of claim 1, wherein the wireless communications network node is in communication with an advertisement module.

25. The network of claim 15, wherein the communications network is associated with an advertisement module.

26. The method of claim 15, wherein the communications network comprises an advertisement module.

27. The method of claim 15, wherein the communications network is in communication with an advertisement module.

* * * * *